March 2, 1926. 1,574,903

P. P. KUCERA

GLASS MACHINE

Filed March 24, 1920 4 Sheets-Sheet 2

Inventor
Peter P. Kucera
By Attorney
George Ramsey

March 2, 1926.

P. P. KUCERA 1,574,903

GLASS MACHINE

Filed March 24, 1920    4 Sheets-Sheet 3

March 2, 1926.

P. P. KUCERA 1,574,903

GLASS MACHINE

Filed March 24, 1920  4 Sheets-Sheet 4

Inventor
Peter P. Kucera
By Attorney
George Ramsey

Patented Mar. 2, 1926.

1,574,903

UNITED STATES PATENT OFFICE.

PETER P. KUCERA, OF CONNELLSVILLE, PENNSYLVANIA, ASSIGNOR TO CAPSTAN GLASS COMPANY, OF CONNELLSVILLE, PENNSYLVANIA, A CORPORATION OF DELAWARE.

GLASS MACHINE.

Application filed March 24, 1920. Serial No. 368,238.

*To all whom it may concern:*

Be it known that I, PETER P. KUCERA, a citizen of the United States, residing at Connellsville, in the county of Fayette, State of Pennsylvania, have invented certain new and useful Improvements in Glass Machines, of which the following is a specification.

This invention relates broadly to glass machinery and more especially to mechanism for shaping glass articles.

The principal object of the present invention is to provide control mechanisms for the shaping operation to predetermine the pressures operating during the shaping operation.

Another object of the present invention is an apparatus for pressing glass wherein the pressing pressures are automatically decreased after the glass has completely filled the mold.

Another object of the present invention is a control mechanism for the glass pressing operation constructed in such manner that the pressing pressure during the pressing operation is automatically relieved when the pressure has been built up to a predetermined amount.

A further object of the present invention is a glass pressing apparatus wherein the shaping of the plastic glass is performed under a full pressure head and the setting of the glass after being formed takes place under a reduced pressure head.

A still further object of the present invention is to provide a mechanism for controlling pressing operations by means of a plurality of inter-related controlling devices arranged in such manner as to cause the initial operations to take place under a relatively high pressure head and the final operations to take place under a reduced pressure head.

A still further object of the present invention is a glass pressing machine wherein the pressing operations are controlled through a timing mechanism operating upon a main controller valve and a secondary controller valve, and wherein the latter is adapted to be operated by direct pressure accumulated in the pressing piston chamber whereby the secondary controller may reduce the pressure within the pressing chamber at a predetermined period in the cycle of operations.

A still further object of the present invention is a glass pressing apparatus wherein the pressing operation is under the control of a timing device which operates upon a main control valve and a secondary control valve, with the latter also under the influence of an automatic control which connects directly with the pressure line leading to the pressing cylinder whereby the pressure in the cylinder is predetermined by setting the automatic valve to operate at predetermined pressures.

Realizing that my invention may be embodied in constructions other than those illustrated in the drawings and described in the specification, I desire that such illustrations and description shall comprise an illustrative embodiment of my invention and shall not be taken in a limiting sense.

In the said drawings accompanying and forming a part of this application, like parts are designated by like characters throughout the several views.

Figure 1:
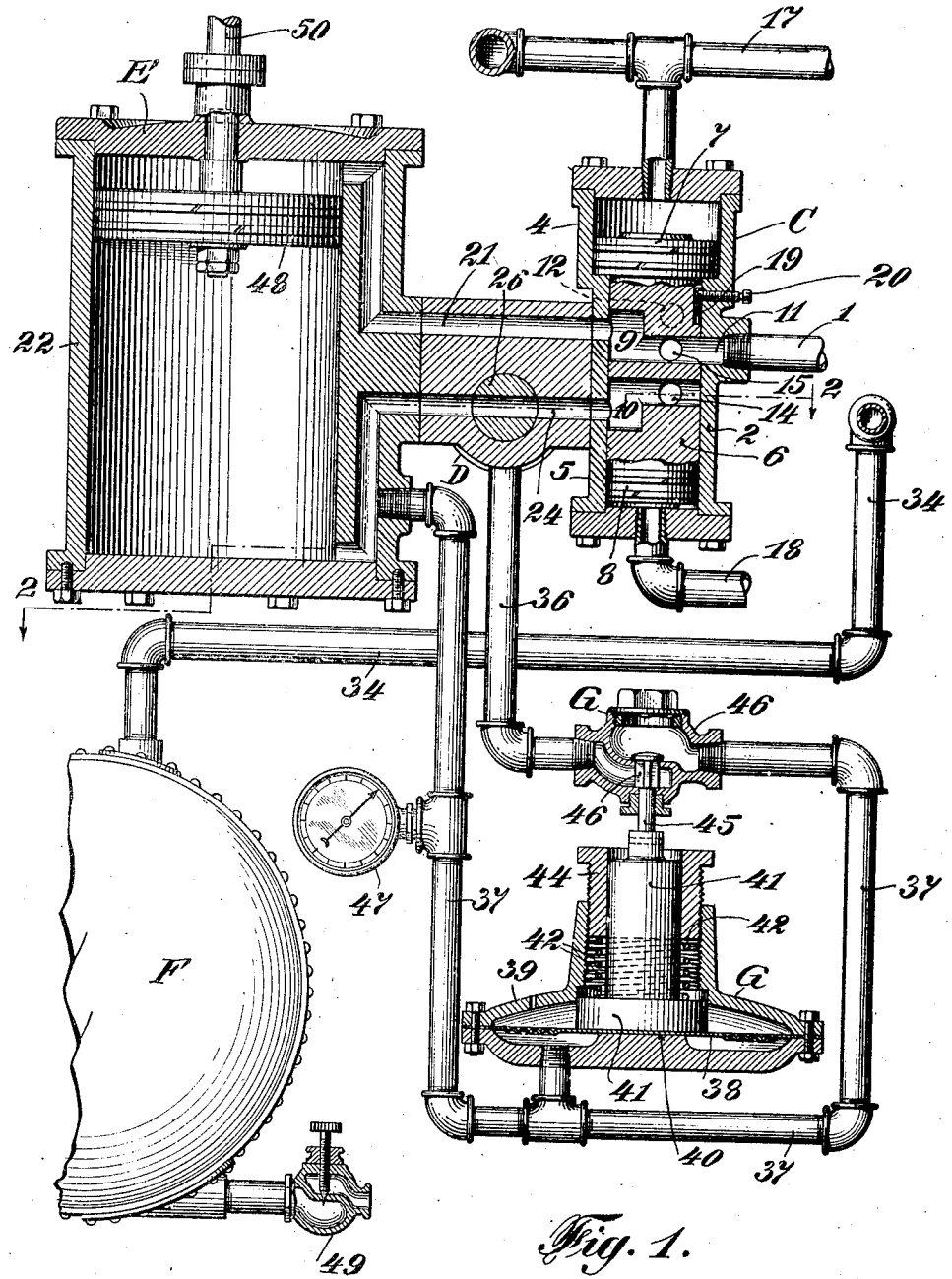
Figure 1 is an elevational view showing the arrangement of the parts with portions of the device in section.

In view of the plastic character of glass, the most common way of handling glass in the manufacture of articles therefrom is either blowing or pressing the glass articles into shape. Where a number of articles are to be formed of predetermined shape and size, the most customary way is to form the articles either by pressing or blowing in a suitable matrix mold. It is obvious that if excessive pressure is applied after the glass has completely filled the mold, there is a tendency for the still plastic glass to try to escape, and in blowing machines this causes defects comprising mold marks, etc., while in pressing machines the glass attempts to escape between the forming parts, and produces defective ware known as "press-ups". In the working of automatic glass machinery, it is usual to work the glass as cold as possible in order not to overheat the metal parts which contact with the glass and in order also to prevent the glass from sticking to such metal parts, and for several other manufacturing reasons.

Cool glass possesses less plasticity and mobility than very hot glass. Consequently the pressing of cool glass requires considerable pressure, in some cases as much as 5,000 pounds. This pressure is necessary to cause the glass to flow into all parts of the mold and to completely fill the mold. It is necessary that the application of this pressure shall occur in a relatively short period of time. There are two reasons for this period of time being short, one being the speed of production which must be maintained by an automatic machine, the other being the tendency of the glass to set as soon as it contacts with the cold surfaces, and unless the pressing operation is quickly performed the glass will set and will not flow. As soon as the glass has completely filled the mold only a relatively small pressure is needed because the glass quickly sets. Before it does set, however, it is necessary that sufficient pressure be applied to prevent any collapse or recession of the glass from the outline desired.

The difficulties above set forth are not encountered in the hand pressing operations because the operator applies the required forces quickly and with precision, and as soon as he feels the stop of his pressing levers due to the glass having filled all parts of the mold, he reduces the amount of applied forces so that in hand-produced ware made by one skilled in the art there is no tendency to produce "press-ups" where the mold parts are properly fitted.

The present invention overcomes the difficulties encountered in automatic glass machine art by providing a construction wherein controllers for the pressures are provided so that full pressure necessary to flow the glass from one part of the mold to another is provided, but as soon as the mold is filled and excessive pressure tends to develop, this excess pressure is relieved and only a sufficient pressure is maintained on the shaping devices to prevent the collapse of the ware until after it has set sufficiently to permit the pressures to be completely relieved.

One embodiment of the present invention to a glass press comprises the admission of air to the pressing plunger piston with this air under suitable controls. The device is operated by a suitable timer such as is common in the art for timing the pressing operation with the other movements of the mold table, etc. The timer operates a main controller and also a secondary controller to admit full pressure beneath the pressing plunger causing the relative movement between the pressing plunger and the mold which contains a suitable charge of glass. Full pressure continues in the air supply lines and causes the piston of the pressing cylinder to continue to travel thereby preventing accumulation of excessive pressure back of the piston. When the glass has completely filled the mold and the travel of the piston is substantially stopped, full pressure begins to accumulate in the cylinder. The cylinder is in communication with an automatic valve which may be set at any desired pressure point. When the pressure in the cylinder reaches a predetermined amount, the automatic valve operates to move the secondary controller valve to cut off the pressure supply to the cylinder and simultaneously drain the cylinder into an empty tank of predetermined capacity. This immediately reduces the pressure on the pressing piston and at the same time maintains a sufficient pressure to prevent collapsing of the ware in the mold. The final pressure is determined by the capacity of the tank, viz, if the capacity of the tank is twice the capacity of the cylinder, the final pressure will be one-third full pressure.

The next operation of the timing device moves the main controller valve to open an exhaust port to atmosphere and to move the secondary controller valve to completely open the passageway leading from the cylinder to the exhaust port whereby the remaining air in the cylinder is exhausted to atmosphere. The operation of the primary controller valve has also admitted air pressure to the upper end of the cylinder above the piston causing the piston to descend. In the meantime the accumulated pressure in the predetermined tank has escaped to atmosphere through a needle valve which is set with a sufficient opening to permit an escape of air from the tank during the pressing operations. This completes the single cycle of operations.

Figures 2, 5:
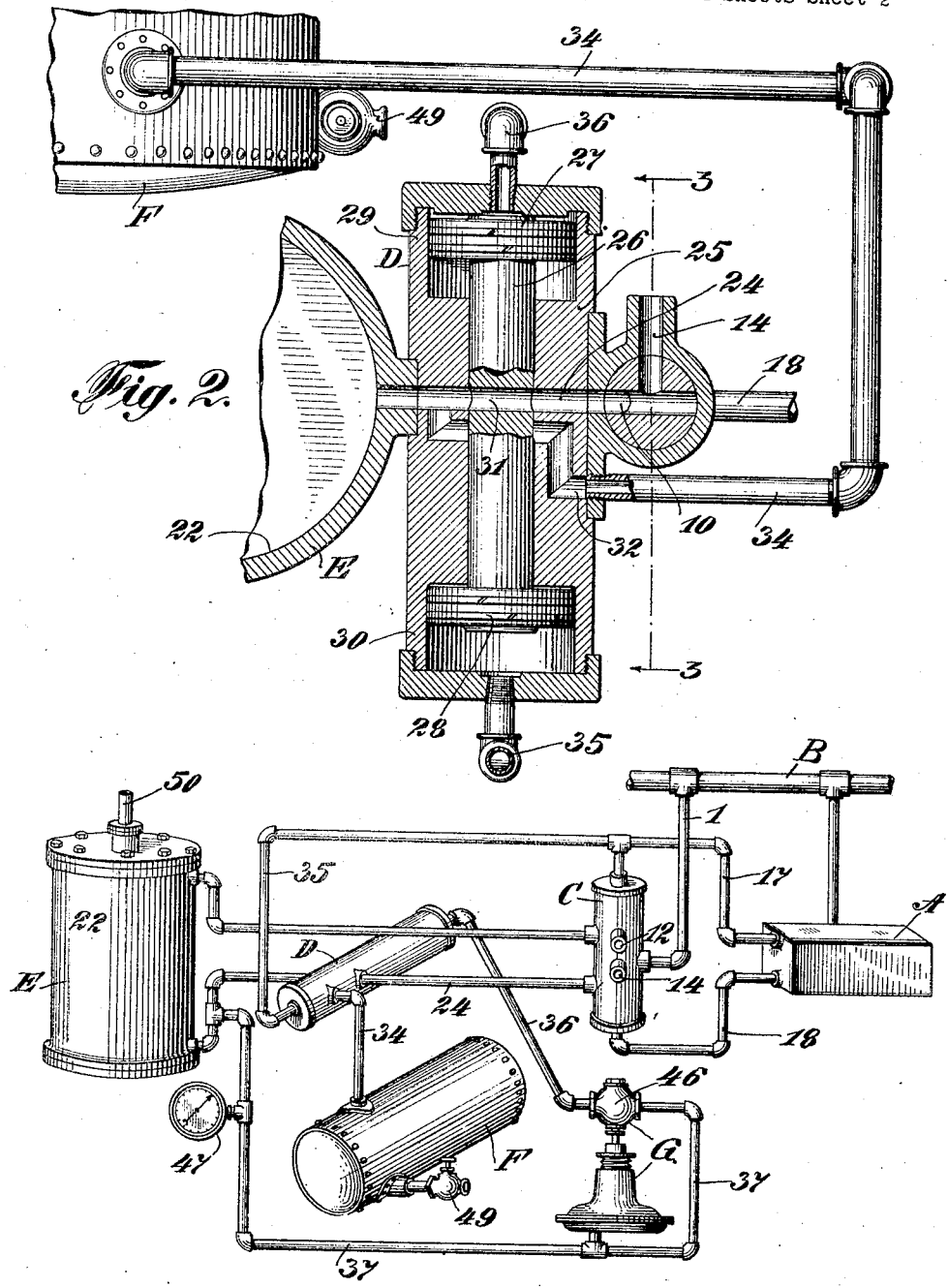
Figure 2 is a detail plan view of a part of the device showing a horizontal section through the main control valve and the secondary control valve taken on line 2—2, Figure 1.
Figure 5 is a diagrammatic illustration of the pipe connections, etc., of the present invention.
Figure 3:
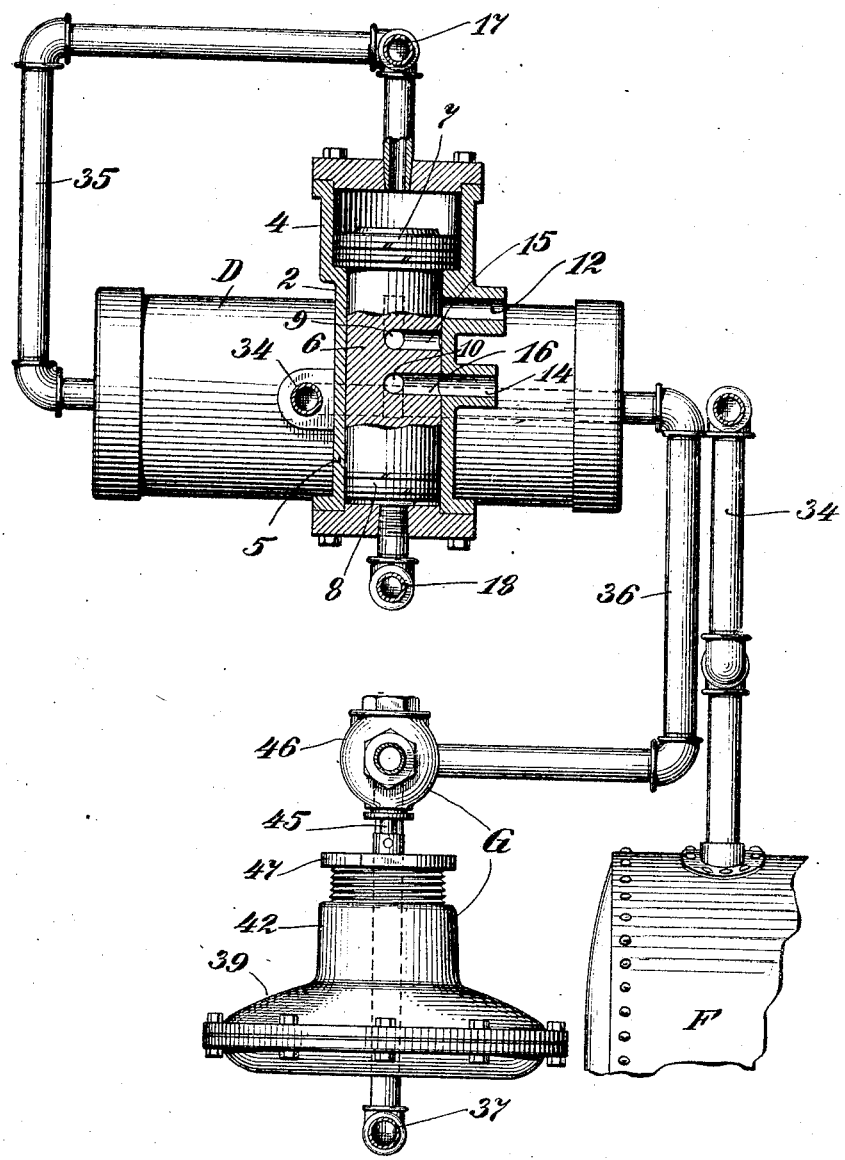
Figure 3 is an elevational view showing a part of the apparatus and is taken on line 3—3, Figure 2.

Referring now to the drawings, and particularly to Figure 5, a timer A, such as is common in the art for controlling pressing operations of a suitable glass press, is connected with a main high pressure air pipe line B. This air line is also connected to the main controller C to supply air through the secondary controller D to the pressing cylinder E. The pressing cylinder, through the secondary controller D, is connected with a receiving tank F and both the pressing cylinder E and the secondary controller D are connected with the automatic controller G.

Referring now to Figure 1, the main controller C is connected by means of a suitable air pipe line 1 with the main air line B at substantially the mid portion of the main controller casing 2. This casing is provided with cylinder portions 4 and 5 in each end of the casing and a piston valve 6 operates in the casing being controlled by pistons 7 and 8 on each end of the valve. The center portion of the piston valve 6 is provided with L shaped ports 9 and 10 which are adapted to cooperate with the opening 11 leading to the air line 1 when the valve is operated, as will be described later. The casing 2 is also provided with exhaust ports 12 and 14 which communicate with side openings 15 and 16 which lead to the L shaped ports 9 and 10 in the piston valve 6. Each end of the casing 2 of the main control valve C is connected with the timer A as by means of pipe lines 17 and 18. The piston 6 is also provided with a groove 19 with which the stub screw 20 cooperates to maintain the piston in proper relation to the ports.

A passageway 21 leads directly from an opening in the casing 2, to the upper end of the presser cylinder 22. A passageway 24 also leads to the secondary controller D. This secondary controller D (see Fig. 2) comprises a casing 25 in which is mounted a piston valve 26 that carries pistons 27 and 28 which slide in short cylinders 29 and 30. The piston valve is provided with a single port 31 which in one position opens the lower passageway 24 that leads from the main controller C to the bottom of the pressing cylinder 22. The casing 25 of the secondary controller is provided with a passageway 32 that connects with a pipe line 34 which leads to the receiving tank F. This passageway 32 is so positioned that when the piston valve 26 is in its right hand position the passageway 32 is in connection with the lower end of the pressure cylinder 22 and the passageway 24 leading to the main controller C is closed. The left hand of the secondary controller D is connected by a suitable pipe line 35 to the pipe line 17 which leads to the timer A so that when air pressure is admitted to the pipe line 17 the piston valve 6 in the main controller C is driven to its lowermost position and the piston valve 26 in the secondary controller D is driven to its right hand position.

The right hand end of the controller D is connected by a suitable pipe line 36 to the automatic valve G, and the other end of the automatic valve is connected with the lower portion of the pressing cylinder 22 by a suitable pipe line 37. This pipe line 37 is likewise connected beneath the diaphragm 38 of the automatic valve. This diaphragm is mounted in a suitable casing 39 and normally rests against the stop 40 which covers the center area portion of the diaphragm. The stop 40 is directly opposite to a plunger 41 which is pressed downward by a spring 42 at a predetermined pressure which may be adjusted by means of the adjusting screw collar 44. The upper end of the plunger 41 is connected to the stem 45 of the valve 46 which is normally seated to prevent air under pressure from passing from the pipe line 37 to the pipe line 36. Preferably a pressure gage 47 is mounted in the pipe line 37 in order to facilitate adjusting the screw 44 so that the automatic controller operates at predetermined pressures. From this construction it will be noted that when the pressure transmitted through the pipe line 37 to the under part of the diaphragm 38 begins to overcome the pressure of the spring 42 on the plunger 41, the plunger will be raised and the diaphragm will leave the stop 40 thereby exposing a larger area of the diaphragm to pressure, and consequently further movement of the plunger will be rapid to open the valve 46 and permit pressure in the line 37 to pass on through the line 36 and into the right hand end of the secondary controller D thereby moving the piston valve 26 to the left and connecting the lower part of the pressure cylinder 22 with the receiving tank F thereby permitting the pressure in the pressing cylinder to be reduced. If the receiving tank F is twice the capacity of the cylinder measured from beneath the piston 48 in the pressure cylinder 22, the pressure will be reduced to one-third that originally in the cylinder. This one-third pressure is sufficient to maintain the parts in the desired relation during the setting of the glass. In order to regulate the pressure on the receiving tank F and to facilitate the escape of compressed air therefrom, this tank is provided with a needle valve 49 which may be adjusted at the will of the operator.

Figure 4:
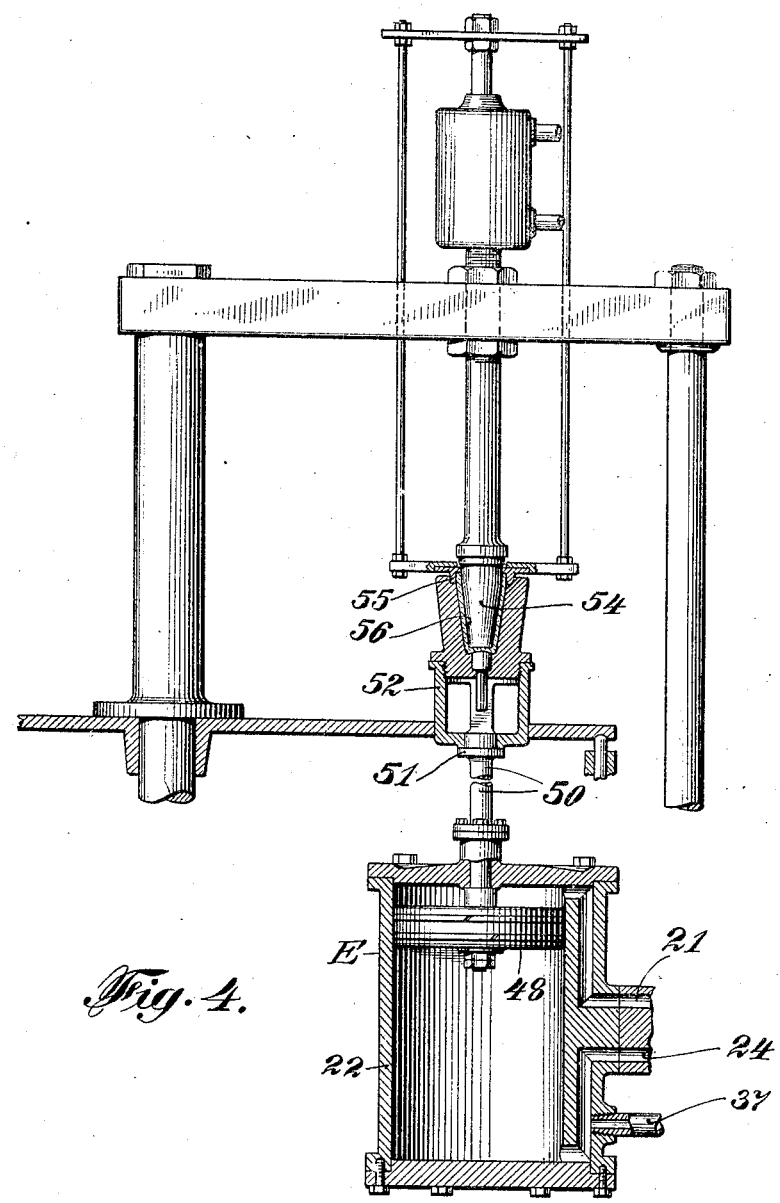
Figure 4 is a detail view showing a portion of the glass press with which the present invention cooperates and showing the completion of the pressing operation.

Referring now to Figure 4, the piston 48 carries a piston rod 50 which is illustrated as being constructed with a lifting head 51 that is adapted to lift the mold 52. As the mold 52 lifts, with its charge of glass therein, the plunger 54 enters the mold through the ring mold 55 and shapes the glass into the glass article 56. The mold table constructions and operations are well known in the art and therefore will not be described in detail.

Referring now to the operations of the device and assuming a mold with a suitable charge of glass therein to be in position over the lifter rod 51, the timer A operates to establish a pressure in the pipe line 17. This action forces the piston valve 6 of the main controller C to the lowermost position as is shown in Figure 1. The air then passes through the passageway 21 into the upper end of the cylinder 22 above the piston 48 and causes the piston to descend.

The pipe line 17 is connected with the left hand end of the secondary cylinder D and therefore the piston valve 26 is moved to its right hand position as is shown in Figure 2, thereby opening the passageway 24 and permitting the compressed air beneath the cylinder to escape through the exhaust port 14 in the main controller C.

The parts have now returned to normal position and are ready for the succeeding operation. Immediately as the mold table has moved to position a new mold, suitably charged with glass, beneath the pressing plunger, the timer A operates to send a charge of compressed air through the pipe line 18 to the bottom of the main controller C. This lifts the piston valve 6 and connects the L shaped port 10 with the passageways 11 and 24, and at the same time connects the upper passageway 21 through the side port 15 to the exhaust port 12. Air pressure from the main pipe line 1 now passes directly into the lower part of the presser cylinder 22 and beneath the piston 48 thereby raising the piston and raising the mold 52 until the plunger 54 shapes the glass article as is shown in Figure 4. The pressure in the lower part of the cylinder 22 in the meantime has been transmitted through the pipe line 37 to beneath the diaphragm 38. This pressure, however, is not as yet sufficient to overcome the spring 42. When the piston 48 stops its upward travel, pressure builds up in the lower part of the cylinder 22 and reaches the point for which the spring 42 is set, consequently raising the diaphragm 38 from the stop 40 which immediately provides a larger effective area and consequently plunger 41 is quickly lifted thereby opening the valve 46 which admits pressure through the pipe lines 37 and 36 to the right hand end of the secondary controller D. This moves the piston valve 26 to the left and connects the lower portion of the presser cylinder 22 directly with the receiving tank F thereby reducing the pressure beneath the piston 48. The final pressure, however, is sufficient in the pressing cylinder to retain the mold tightly against the plunger 54.

This relation of parts is maintained until the glass sets and the timer A again operates to admit pressure into the pipe line 17 when the lower end of the pressing cylinder 22 is vented to atmosphere and pressure is admitted above the piston 48 to return it to the normal position.

From the above outline of one embodiment of my invention it will be seen that excessive shaping pressure is avoided after the article has been completely formed into shape and "press-ups" or other defects due to excessive pressure will be thereby avoided.

Having described my invention, what I claim is:—

1. In an automatic glass machine, the combination of pressing devices, a plurality of interacting controllers for controlling the operation of said pressing devices, a timer for operating said controllers, an automatic relief device operative on one of said controllers for relieving the pressure on said devices when the pressure has reached a predetermined limit, a tank of predetermined capacity to receive the relieved pressure and to regulate the final pressure, and a regulating outlet valve on the tank.

2. In an automatic glass machine, the combination of glass pressing devices, a main pressure air line, a main controller operatively connected with said air line and said devices, a secondary controller connected to said main controller and also to said devices, a receiving tank connected to said secondary controller, and an automatic controller connected to said devices and to said secondary controller, and a timer constructed to operate said main controller in two directions and said secondary controller in one direction, the parts being constructed and arranged to relieve the pressure on said devices when the forming operation has been completed.

3. In an automatic glass machine, the combination of a mold, a plunger cooperative with said mold, means to cause a relative movement between said mold and said plunger, devices to supply air pressure to operate the said means, a receiving tank of a predetermined capacity, and devices to connect said receiving tank with said means when the glass article has been formed into shape.

4. In an automatic glass machine, the combination of a mold, a plunger cooperative with said mold, means to cause a relative movement between said mold and said plunger, devices to supply air pressure to operate the said means, a receiving tank of a predetermined capacity, and devices controlled by the pressure operative on the plunger to connect said receiving tank with said means when the glass article has been formed into shape.

5. In a glass machine, the combination of pressing devices comprising an air-operated piston, means to supply compressed air to operate said piston, a plurality of controllers for predetermining the operation of said air, a receiving tank, and adjustable means for permitting the air under pressure beneath said piston to flow into said tank when the glass article has been formed.

6. In a glass machine, the combination of pressing devices comprising a cylinder with a piston operating therein, means to supply compressed air to cause said piston to reciprocate in said cylinder, controller devices for controlling said compressed air, a receiving tank, and means for automatically discharging compressed air from one end of said cylinder into said receiving tank when the air pressure in said cylinder has reached a predetermined point.

PETER P. KUCERA.